(12) United States Patent
Sulphur

(10) Patent No.: US 11,780,757 B2
(45) Date of Patent: Oct. 10, 2023

(54) APPARATUS AND METHODS FOR DEWATERING SLUDGE

(71) Applicant: Biovac Solutions Inc., Salmon Arm (CA)

(72) Inventor: Terry Sulphur, Salmon Arm (CA)

(73) Assignee: Biovac Solutions Inc., Salmon Arm (CA)

( * ) Notice: Subject to any disclaimer, the term of this patent is extended or adjusted under 35 U.S.C. 154(b) by 0 days.

(21) Appl. No.: 17/655,747

(22) Filed: Mar. 21, 2022

(65) Prior Publication Data

US 2022/0212974 A1    Jul. 7, 2022

Related U.S. Application Data

(62) Division of application No. 16/624,023, filed as application No. PCT/CA2018/050760 on Jun. 21, 2018, now Pat. No. 11,292,739.

(Continued)

(51) Int. Cl.
  *C02F 11/147* (2019.01)
  *C02F 11/121* (2019.01)
  (Continued)

(52) U.S. Cl.
  CPC .......... *C02F 11/147* (2019.01); *C02F 11/121* (2013.01); *B01D 29/115* (2013.01); *B01D 35/027* (2013.01); *B01D 35/26* (2013.01)

(58) Field of Classification Search
  None
  See application file for complete search history.

(56) References Cited

U.S. PATENT DOCUMENTS

| 1,166,713 A | 1/1916 | Otterson |
| 1,295,056 A | 2/1919 | Otterson |

(Continued)

FOREIGN PATENT DOCUMENTS

| CN | 102099303 A | 6/2011 |
| CN | 104334502 A | 2/2015 |

(Continued)

OTHER PUBLICATIONS

Third Office Action issued in connection with Chinese Patent Application No. 201880041500.6, National Intellectual Property Administration of the PRC, dated Sep. 30, 2022.

(Continued)

*Primary Examiner* — Robert J Popovics
(74) *Attorney, Agent, or Firm* — DENTONS CANADA LLP

(57) ABSTRACT

An apparatus for dewatering sludge comprises a tank having an internal space divided by a dividing wall into an intake chamber and an extract chamber, an intake pipe connected to the intake chamber by an intake valve, a discharge pipe connected to the extract chamber by a discharge valve, and a transfer pipe providing fluid communication between the intake chamber and the extract chamber. The transfer pipe has first opening near the bottom of the intake chamber, and a second opening near the top of the extract chamber. A pump selectively creates positive and negative pressure within the intake chamber. A screen is positioned within the extract chamber between the second opening of the transfer pipe and the discharge pipe.

1 Claim, 11 Drawing Sheets

Related U.S. Application Data

(60) Provisional application No. 62/523,033, filed on Jun. 21, 2017.

(51) Int. Cl.
  *B01D 29/11* (2006.01)
  *B01D 35/027* (2006.01)
  *B01D 35/26* (2006.01)

(56) References Cited

U.S. PATENT DOCUMENTS

| | | | |
|---|---|---|---|
| 1,331,239 A * | 2/1920 | Cartwright | E03F 7/10 210/241 |
| 1,331,900 A * | 2/1920 | Cartwright | B60P 1/283 210/241 |
| 1,343,471 A | 6/1920 | Otterson | |
| 1,344,710 A | 6/1920 | Otterson | |
| 1,345,531 A * | 7/1920 | Cartwright | F04D 29/605 210/241 |
| 1,388,511 A * | 8/1921 | Cartwright | E03F 7/10 210/241 |
| 1,437,007 A | 11/1922 | Otterson | |
| 1,437,008 A * | 11/1922 | Otterson | E03F 7/10 210/241 |
| 1,465,968 A | 8/1923 | Caps | |
| 2,010,538 A * | 8/1935 | Evans | E03F 7/10 210/241 |
| 2,303,491 A | 12/1942 | Otterson | |
| 2,638,224 A | 5/1953 | Rupp | |
| 2,664,911 A | 1/1954 | Thompson et al. | |
| 2,782,929 A | 2/1957 | Colket | |
| 2,987,186 A | 6/1961 | Burgoon et al. | |
| 3,013,665 A | 12/1961 | Schmidt et al. | |
| 3,028,011 A | 4/1962 | McGivern | |
| 3,133,492 A * | 5/1964 | Czulak | A01J 25/15 425/149 |
| 3,159,420 A * | 12/1964 | McCrossen | B60R 13/01 296/183.1 |
| 3,190,057 A * | 6/1965 | Sinex | E21B 43/34 55/501 |
| 3,262,571 A | 7/1966 | Petretti | |
| 3,317,049 A | 5/1967 | Petretti | |
| 3,460,677 A | 8/1969 | Fifer | |
| 3,463,172 A | 8/1969 | Naylor | |
| 3,593,853 A * | 7/1971 | Koethke | B01D 29/84 210/320 |
| RE27,346 E | 4/1972 | Naylor | |
| 3,677,409 A | 7/1972 | Ferm et al. | |
| 4,016,994 A | 4/1977 | Wurster | |
| 4,021,347 A | 5/1977 | Teller et al. | |
| 4,046,689 A | 9/1977 | Argyll | |
| 4,082,672 A | 4/1978 | Petroski | |
| 4,134,174 A | 1/1979 | Flynn et al. | |
| 4,199,837 A | 4/1980 | Fisco, Jr. | |
| 4,200,535 A | 4/1980 | Kennedy, Jr. | |
| 4,207,647 A | 6/1980 | Masters | |
| 4,213,479 A | 7/1980 | Pearson | |
| 4,322,868 A | 4/1982 | Wurster | |
| 4,333,835 A | 6/1982 | Lynch | |
| 4,367,145 A | 1/1983 | Simpson et al. | |
| 4,377,475 A | 3/1983 | Wiedemann | |
| 4,378,290 A | 3/1983 | Kennedy, Jr. | |
| 4,383,920 A | 5/1983 | Muller et al. | |
| 4,389,314 A | 6/1983 | Petretti | |
| 4,426,020 A | 1/1984 | Presseau et al. | |
| 4,436,622 A | 3/1984 | Petretti | |
| 4,525,277 A | 6/1985 | Poulin | |
| 4,543,183 A | 9/1985 | Petretti | |
| 4,578,198 A | 3/1986 | Schmidt et al. | |
| 4,816,167 A | 3/1989 | Vanderslice | |
| 4,854,058 A | 8/1989 | Sloan et al. | |
| 4,871,454 A * | 10/1989 | Lott | B01D 29/23 210/477 |
| 4,904,126 A | 2/1990 | Voith | |
| 4,925,552 A | 5/1990 | Bateson et al. | |
| 4,929,353 A | 5/1990 | Harris | |
| 4,975,205 A | 12/1990 | Sloan | |
| 4,997,562 A | 3/1991 | Warner | |
| 5,021,156 A | 6/1991 | Sloan | |
| 5,024,346 A * | 6/1991 | Roser | B65D 77/0453 222/105 |
| 5,098,364 A * | 3/1992 | Schilling | B31B 70/00 493/200 |
| 5,098,580 A | 3/1992 | Andersen | |
| 5,110,005 A * | 5/1992 | Schilling | B31B 70/00 220/495.08 |
| 5,141,650 A * | 8/1992 | Cavo | B01D 29/014 210/162 |
| 5,183,086 A | 2/1993 | Fanta et al. | |
| 5,192,428 A | 3/1993 | Lindstrom | |
| 5,288,737 A | 2/1994 | Krieger | |
| 5,296,150 A | 3/1994 | Taylor, Jr. | |
| 5,312,551 A | 5/1994 | Perron et al. | |
| 5,411,665 A | 5/1995 | Scraggs et al. | |
| 5,423,981 A | 6/1995 | Krieger | |
| 5,462,661 A | 10/1995 | Nasu | |
| 5,492,635 A | 2/1996 | Ball | |
| 5,503,753 A | 4/1996 | Woodall et al. | |
| 5,536,418 A | 7/1996 | Foss | |
| 5,547,514 A | 8/1996 | Ward et al. | |
| 5,569,376 A | 10/1996 | Graves | |
| 5,589,081 A * | 12/1996 | Harris | B01D 29/23 210/455 |
| 5,595,654 A * | 1/1997 | Caughman, Jr. | B01D 29/23 210/406 |
| 5,597,732 A * | 1/1997 | Bryan-Brown | C05F 17/914 435/290.4 |
| 5,667,689 A | 9/1997 | Graves | |
| 5,681,460 A * | 10/1997 | Caughman, Jr. | B01D 29/96 210/232 |
| 5,707,535 A | 1/1998 | Harris | |
| 5,718,015 A | 2/1998 | Rohrbacher | |
| 5,720,885 A | 2/1998 | Moos | |
| 5,722,113 A | 3/1998 | Baziuk | |
| 5,741,208 A * | 4/1998 | Moak | B65F 1/06 493/195 |
| 5,746,862 A * | 5/1998 | Derby | B29C 63/22 156/271 |
| 5,776,567 A | 7/1998 | Schilling et al. | |
| 5,858,226 A | 1/1999 | Caughman, Jr. | |
| 5,860,767 A | 1/1999 | Atkins | |
| 5,861,093 A | 1/1999 | Bennett | |
| 5,868,172 A | 2/1999 | Graves | |
| 5,946,767 A | 9/1999 | Sinz | |
| 5,975,642 A * | 11/1999 | Dibble | B60P 1/60 220/601 |
| 6,004,461 A | 12/1999 | Harris | |
| 6,013,138 A | 1/2000 | Sinz | |
| 6,067,900 A | 5/2000 | Lackner et al. | |
| 6,074,557 A | 6/2000 | Lyles, Sr. et al. | |
| 6,146,528 A | 11/2000 | Caughman, Jr. et al. | |
| 6,146,530 A | 11/2000 | Vollmer | |
| 6,149,345 A | 11/2000 | Atkins | |
| 6,214,092 B1 | 4/2001 | Odom et al. | |
| 6,258,268 B1 | 7/2001 | Lake | |
| 6,281,001 B1 | 8/2001 | McNelly | |
| 6,364,122 B1 | 4/2002 | Massey | |
| 6,379,547 B1 | 4/2002 | Larsson | |
| 6,395,184 B1 * | 5/2002 | Bukhtiyarov | C10G 31/09 210/708 |
| 6,412,877 B1 * | 7/2002 | Faison | B60P 1/26 298/23 S |
| 6,453,584 B1 | 9/2002 | Buckner | |
| 6,547,964 B1 | 4/2003 | Rajewski | |
| 6,604,304 B1 | 8/2003 | Slabach | |
| 6,607,666 B2 | 8/2003 | Rajewski | |
| 6,616,834 B2 | 9/2003 | Anderson | |
| 6,627,434 B1 | 9/2003 | McNelly | |
| 6,790,368 B1 | 9/2004 | Vachon et al. | |
| 6,808,626 B2 | 10/2004 | Kulbeth | |
| 6,911,145 B2 * | 6/2005 | Hutchinson | B01D 29/33 210/489 |

(56) References Cited

U.S. PATENT DOCUMENTS

| | | | |
|---|---|---|---|
| 6,977,038 B2* | 12/2005 | Jowett | C02F 3/10 |
| | | | 210/220 |
| 7,033,496 B2 | 4/2006 | Thacker et al. | |
| 7,045,068 B2* | 5/2006 | Hutchinson | B01D 36/001 |
| | | | 210/406 |
| 7,179,377 B1* | 2/2007 | Caughman, Jr. | B01D 29/05 |
| | | | 210/477 |
| 7,282,143 B2 | 10/2007 | Liao | |
| 7,410,576 B2 | 8/2008 | Brouillard et al. | |
| 7,429,319 B2 | 9/2008 | Davis | |
| 7,503,134 B2 | 3/2009 | Buckner | |
| 7,544,302 B2 | 6/2009 | Harding | |
| 7,578,930 B2 | 8/2009 | Williamson et al. | |
| 7,846,331 B2 | 12/2010 | Baziuk | |
| 7,943,051 B2 | 5/2011 | Dieziger | |
| 8,002,974 B2 | 8/2011 | Noling et al. | |
| 8,261,918 B1 | 9/2012 | Powell et al. | |
| 8,518,268 B1 | 8/2013 | Nauertz | |
| 8,667,717 B2* | 3/2014 | Maybury, Jr | E02F 3/88 |
| | | | 175/66 |
| 8,679,335 B1 | 3/2014 | Dufort | |
| D714,691 S | 10/2014 | Costello et al. | |
| D714,692 S | 10/2014 | Costello et al. | |
| 8,925,753 B2* | 1/2015 | Maybury, Jr. | E02F 3/925 |
| | | | 49/340 |
| 9,260,048 B2* | 2/2016 | Maybury, Jr. | E02F 3/8891 |
| 9,260,049 B2* | 2/2016 | Maybury, Jr. | E02F 3/925 |
| 9,260,050 B2* | 2/2016 | Maybury, Jr. | E02F 3/8891 |
| 9,399,853 B2* | 7/2016 | Maybury | E02F 3/8891 |
| 9,528,259 B2 | 12/2016 | Bossom | |
| 9,816,250 B2* | 11/2017 | Maybury | E02F 3/8891 |
| 9,821,953 B2* | 11/2017 | Sewell | B65D 90/008 |
| 10,005,029 B2 | 6/2018 | Dawson et al. | |
| 10,022,656 B2 | 7/2018 | Day | |
| 10,029,922 B2 | 7/2018 | Segroves et al. | |
| 10,099,160 B2 | 10/2018 | Dawson et al. | |
| 10,119,245 B2 | 11/2018 | Buchleiter et al. | |
| 10,150,062 B2 | 12/2018 | Dawson et al. | |
| 10,155,181 B2 | 12/2018 | Dawson et al. | |
| 10,207,863 B2* | 2/2019 | Sewell | B65D 90/008 |
| 10,221,602 B2* | 3/2019 | Sewell | E05F 1/1091 |
| 10,337,167 B2* | 7/2019 | Maybury, Jr. | E02F 5/003 |
| 10,436,624 B2 | 10/2019 | Brodbeck | |
| 10,443,210 B2* | 10/2019 | Maybury, Jr. | E02F 5/226 |
| 10,538,949 B2* | 1/2020 | Sewell | E05F 1/1091 |
| 10,563,375 B2* | 2/2020 | Maybury | B60P 3/2245 |
| 10,583,379 B2 | 3/2020 | Cote | |
| 10,653,977 B2* | 5/2020 | Dawson | B60P 1/04 |
| 10,661,206 B2* | 5/2020 | Day | B01D 29/27 |
| 10,675,572 B2* | 6/2020 | Day | B01D 29/23 |
| 10,802,699 B2 | 10/2020 | Brodbeck et al. | |
| 10,844,575 B2* | 11/2020 | Maybury, Jr. | B65D 45/28 |
| 10,920,397 B2 | 2/2021 | Buchleiter et al. | |
| 10,954,661 B2 | 3/2021 | Polston | |
| 10,994,227 B2 | 5/2021 | Ros | |
| 11,041,287 B2* | 6/2021 | Maybury, Jr. | E02F 7/00 |
| 11,292,739 B2* | 4/2022 | Sulphur | E03F 7/103 |
| 11,479,492 B2* | 10/2022 | Logan | C02F 11/122 |
| 2003/0070977 A1 | 4/2003 | Anderson | |
| 2004/0011749 A1* | 1/2004 | Hutchinson | B01D 29/23 |
| | | | 210/406 |
| 2004/0079691 A1 | 4/2004 | Jowett | |
| 2005/0184000 A1 | 8/2005 | Jowett | |
| 2006/0011561 A1 | 1/2006 | Brouillard et al. | |
| 2006/0021953 A1 | 2/2006 | LeCraw | |
| 2006/0236498 A1 | 10/2006 | Nuhn | |
| 2007/0034578 A1 | 2/2007 | Brouillard et al. | |
| 2007/0090038 A1 | 4/2007 | Inoue et al. | |
| 2007/0163938 A1 | 7/2007 | Davis | |
| 2008/0023412 A1 | 1/2008 | Holt | |
| 2010/0147753 A1 | 6/2010 | Baziuk | |
| 2010/0206817 A1 | 8/2010 | Dieziger | |
| 2013/0043195 A1 | 2/2013 | O'Konek et al. | |
| 2013/0048575 A1 | 2/2013 | Gruber et al. | |
| 2013/0200007 A1 | 8/2013 | O'Konek et al. | |
| 2014/0116965 A1 | 5/2014 | Cote | |
| 2014/0262993 A1 | 9/2014 | Bossom | |
| 2015/0001161 A1 | 1/2015 | Wiemers et al. | |
| 2016/0289109 A1 | 10/2016 | Ghalib | |
| 2017/0107134 A1 | 4/2017 | Wiemers et al. | |
| 2017/0107135 A1 | 4/2017 | Wiemers et al. | |
| 2017/0107136 A1 | 4/2017 | Wiemers et al. | |
| 2017/0233275 A1 | 8/2017 | Segroves et al. | |
| 2019/0163340 A1 | 5/2019 | Brodbeck et al. | |
| 2020/0172420 A1* | 6/2020 | Sulphur | E03F 7/103 |
| 2021/0025155 A1 | 1/2021 | Rajewski | |
| 2022/0212974 A1* | 7/2022 | Sulphur | C02F 11/121 |

FOREIGN PATENT DOCUMENTS

| | | |
|---|---|---|
| EP | 3179001 A1 | 6/2017 |
| JP | S54-008177 U | 1/1979 |
| JP | 06-063599 A | 3/1994 |
| JP | H09-294997 A | 11/1997 |
| JP | 2006136773 A | 6/2006 |
| JP | 2008-18308 A | 1/2008 |
| JP | 4616400 B2 | 1/2011 |
| WO | 2018/232517 A1 | 12/2018 |

OTHER PUBLICATIONS

Office Action issued in connection with Korean Patent Application No. 10-2020-7001893, Korean Intellectual Property Office, dated Nov. 14, 2022.

Second Office Action issued in connection with Japanese Patent Application No. 2020-520689, Japanese Patent Office, dated Nov. 15, 2022.

International Search Report and Written Opinion for International Application No. PCT/CA2018/050760, International Searching Authority, dated Sep. 6, 2018.

Patent Examination Report 1 issued in connection with New Zealand Patent Application No. 760955, New Zealand Intellectual Property Office, dated Nov. 3, 2020.

Examination Report No. 1 issued in connection with Australian Patent Application No. 2018288565, IP Australia, dated Dec. 1, 2020.

Extended European Search Report issued in connection with European Patent Application No. 18820812.8, European Patent Office, dated Jan. 14, 2021.

Patent Examination Report 2 issued in connection with New Zealand Patent Application No. 760955, New Zealand Intellectual Property Office, dated May 5, 2021.

Search Report issued in connection with Chinese Patent Application No. 201880041500.6, National Intellectual Property Administration of the PRC, dated Oct. 14, 2021.

First Office Action issued in connection with Chinese Patent Application No. 201880041500.6, National Intellectual Property Administration of the PRC, dated Oct. 20, 2021.

Examination Report No. 2 issued in connection with Australian Patent Application No. 2018288565, IP Australia, dated Nov. 18, 2021.

Examination Report No. 3 issued in connection with Australian Patent Application No. 2018288565, IP Australia, dated Nov. 29, 2021.

Communication Pursuant to Article 94(3) EPC issued in connection with European Patent Application No. 18820812.8, European Patent Office, dated Dec. 17, 2021.

Office Action issued in connection with Japanese Patent Application No. 2020-520689, Japanese Patent Office, dated May 10, 2022.

Second Office Action issued in connection with Chinese Patent Application No. 201880041500.6, National Intellectual Property.

Patent Examination Report 3 issued in connection with New Zealand Patent Application No. 760955, New Zealand Intellectual Property Office, dated Aug. 6, 2021.

Decision on Rejection issued in connection with Chinese Patent Application No. 201880041500.6, National Intellectual Property Administration of the PRC, dated Feb. 22, 2023.

(56) References Cited

OTHER PUBLICATIONS

Notice of Allowance issued in connection with Korean Patent Application No. 10-2020-7001893 dated May 16, 2023.

\* cited by examiner

APPARATUS AND METHODS FOR DEWATERING SLUDGE

CROSS-REFERENCE TO RELATED APPLICATIONS

This application is a division of U.S. patent application Ser. No. 16/624,023 filed on Dec. 18, 2019, which is the US national stage of International Application No. PCT/CA2018/050760 filed on Jun. 21, 2018, which in turn claims the benefit of priority of U.S. Patent Application No. 62/523,033 filed on Jun. 21, 2017. U.S. patent application Ser. No. 16/624,023, International Patent Application No. PCT/CA2018/050760 and U.S. Patent Application No. 62/523,033 are hereby incorporated by reference in their entirety.

TECHNICAL FIELD

The present disclosure relates to sewage sludge treatment, and in particular to apparatus and methods for dewatering sludge and other materials.

BACKGROUND

Sewage sludge is composed of a mixture of solid and liquid. Separating the liquid from the solid allows the liquid to be reused and the solid to be more efficiently transported for treatment. Various systems for separating liquids from sludge or other materials exist in the prior art, including: U.S. Pat. Nos. 3,677,409, 5,503,753, 4,816,167, 3,028,011, US 2016/0289109, U.S. Pat. Nos. 5,462,661 and 4,021,347.

The inventor has determined a need for improved apparatus, methods and systems for dewatering sludge and other materials.

SUMMARY

One aspect of the present disclosure provides an apparatus for dewatering sludge. The apparatus comprises a tank having an internal space divided by a dividing wall into an intake chamber and an extract chamber, an intake pipe connected to the intake chamber by an intake valve, a discharge pipe connected to the extract chamber by a discharge valve, and a transfer pipe providing fluid communication between the intake chamber and the extract chamber. The transfer pipe has a first opening near the bottom of the intake chamber, and a second opening near the top of the extract chamber. A pump selectively creates positive and negative pressure within the intake chamber. A screen is positioned within the extract chamber between the second opening of the transfer pipe and the discharge pipe.

Another aspect provides a method for dewatering sludge. The method comprises providing a tank having an internal space divided by a dividing wall into an intake chamber and an extract chamber, an intake pipe connected to the intake chamber by an intake valve, a discharge pipe connected to the extract chamber by a discharge valve, a transfer pipe providing fluid communication between the intake chamber and the extract chamber, with a first opening near the bottom of the intake chamber and a second opening near the top of the extract chamber, a pump for selectively creating positive and negative pressure within the intake chamber, and, a screen within the extract chamber positioned between the second opening of the transfer pipe and the discharge pipe. The method further comprises applying negative pressure to the intake tank by the pump with the intake valve open to suck a mixture of solid and liquid into the intake tank, through the intake pipe; injecting a polymer into the intake tank to coagulate the solids; and applying positive pressure to the intake tank by the pump with the intake valve closed, the transfer valve open and the discharge valve open to force the mixture of coagulated solid and liquid through the transfer pipe into the extract chamber, whereby the screen traps the coagulated solids allowing liquid to pass through the discharge pipe.

Further aspects and details of example embodiments are set forth below.

DRAWINGS

The following figures set forth embodiments in which like reference numerals denote like parts. Embodiments are illustrated by way of example and not by way of limitation in the accompanying figures.

DETAILED DESCRIPTION

Figure 1:
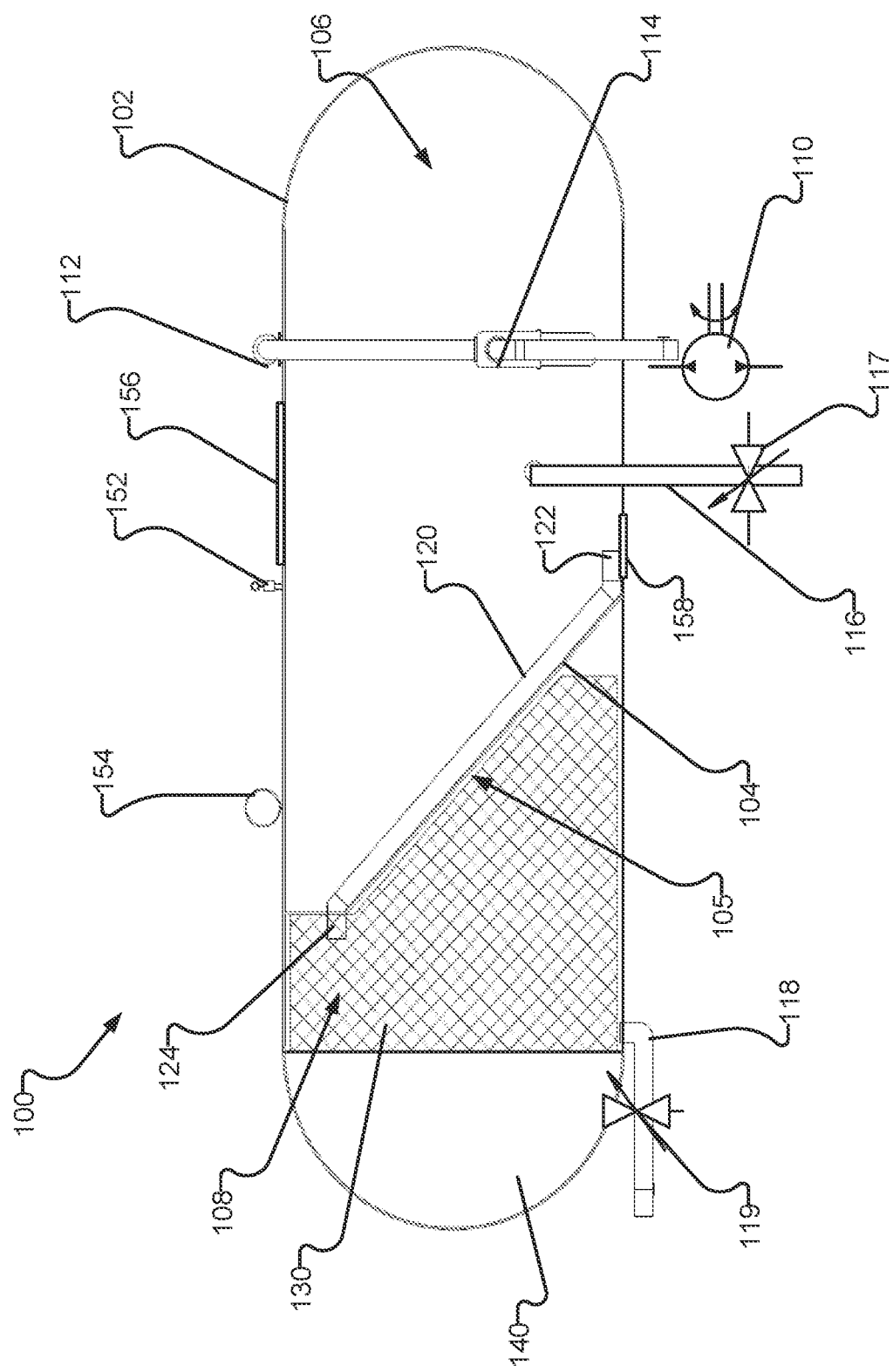
FIG. 1 shows a cross section of an example dewatering apparatus according to one embodiment with the door closed.

The following describes example apparatus and methods for dewatering sludge.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figure 2:
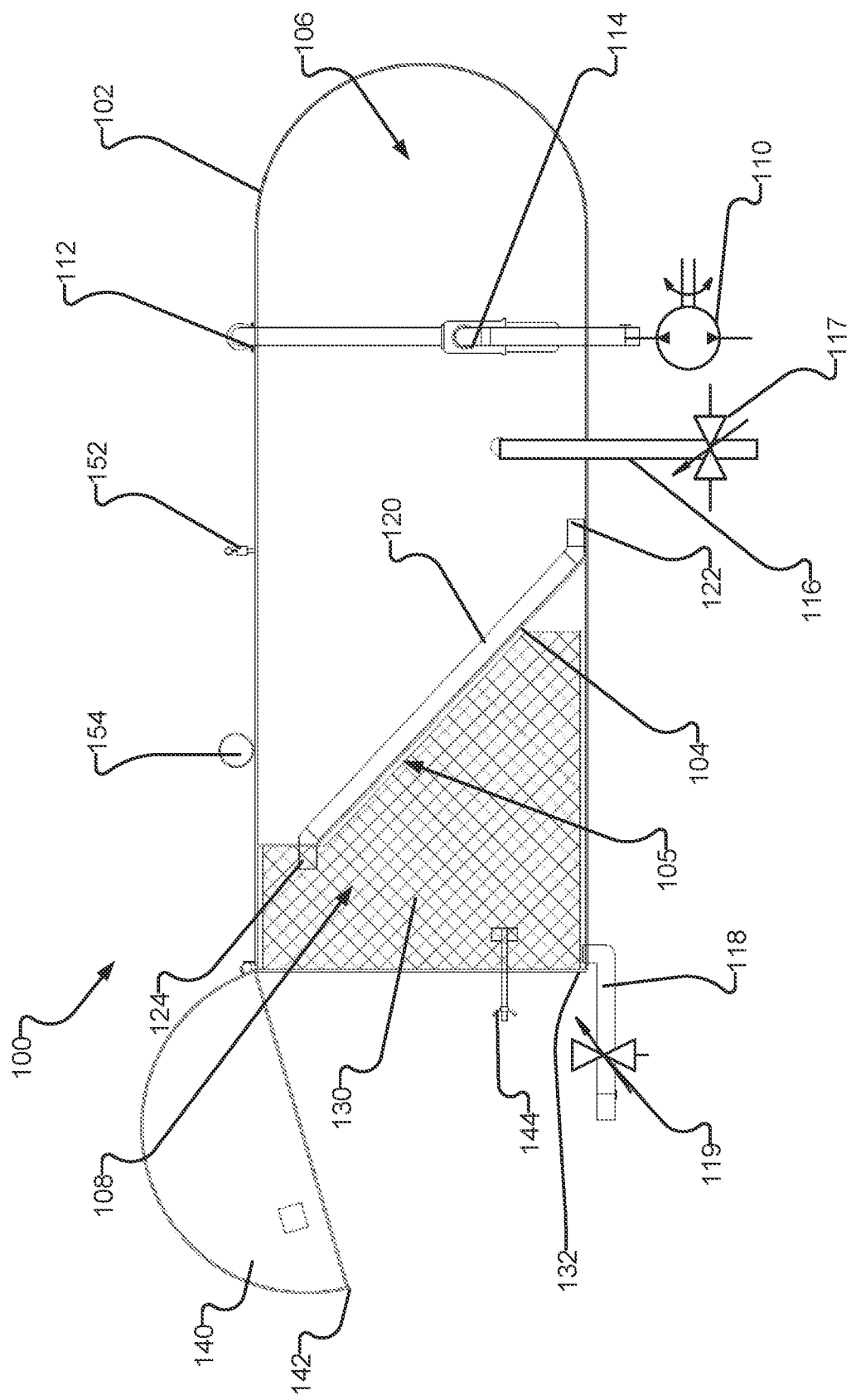
FIG. 2 shows a cross section of the apparatus of FIG. 1 with the door open.

FIG. 1 and FIG. 2 show a cross section of an example apparatus 100 for dewatering sludge. The apparatus 100 comprises a tank 102 having an internal space divided by a dividing wall 104 into an intake chamber 106 and an extract chamber 108. A pump 110 is connected to the intake chamber 106 to selectively create positive and negative pressure in the intake chamber 106. The pump 110 may have a primary filter 112 and a secondary filter 114. The pump 110 and filters 112/114 may be substantially the same as those in standard vacuum trucks. An intake pipe 116 having an intake valve 117 is connected to the intake chamber 106 for drawing sludge or other materials into the tank as discussed below. A coarse intake filter (not shown), such as for example a canister filter, may be provided on the intake pipe to prevent large (e.g. greater than about ½ inch diameter) solids from entering the intake chamber. A discharge pipe 118 having a discharge valve 119 is connected to the extract chamber 108 for discharge of liquids from the tank as discussed below.

A transfer pipe 120 provides fluid communication between the intake chamber 106 and the extract chamber 108. The transfer pipe 120 has a first opening 122 near the bottom of the intake chamber 106 and a second opening 124 near the top of the extract chamber 108. The dividing wall 104 has an opening near the top thereof to permit the transfer pipe 120 to pass through, but otherwise seals off the extract chamber 108 from the intake chamber 106.

A screen 130 is positioned within the extract chamber 108 between the second opening 124 of the transfer pipe 120 and the opening of the discharge pipe 118. In some embodiments, as illustrated in FIG. 1, the screen 130 may substantially conform to the shape of the extract chamber 108 and may have a hole for the second opening 124 of the transfer pipe 120. Details of an example screen are discussed below with reference to FIG. 5. In the illustrated example, the end portion of the extract chamber 108 of the tank 102 comprises a door 140 which may be opened to permit access to the extract chamber 108 for removal of solids. The screen 130 comprises an open end with a generally circular rim 132 which presses up against a rim 142 of the door 140 when the screen 130 is in place and the door 140 is closed. The door 140 may be held closed by a buckle latch 144, as shown in FIG. 2, or any other suitable mechanism. The tank 102 may also be provided with a relief valve 152 and pressure gauge 154. In some embodiments, the tank 102 also has an access hatch 156 (see FIG. 1) in an upper portion of the intake chamber 106 for providing access thereto, and a cleaning port 158 (see FIG. 1) in a lower portion of the intake chamber 106 near the bottom of the transfer pipe 120 and the dividing wall 104. The hatch 156 and/or port 158 may be at different locations in other embodiments.

In the illustrated example, the transfer pipe 120 is at an approximately 45 degree angle from the horizontal. The transfer pipe 120 may be at a different angle from the horizontal in other embodiments. As used herein, the term "horizontal" refers to a direction parallel to the longitudinal axis of the tank 102, such that the absolute angle of "horizontal" may change as the orientation of the tank 102 changes. This configuration permits any sludge or other materials remaining in the intake chamber 106 or transfer pipe 120 to fall into the extract chamber 108 when the tank 102 is tipped for dumping or cleaning as discussed below. In the illustrated example, an angled portion 105 of the dividing wall 104 is also at an approximately 45 degree angle from the horizontal. The dividing wall 104 and transfer pipe 120 may be differently configured in other embodiments (for example, the dividing wall may extend vertically upward from the first opening at the bottom end of the transfer pipe in some embodiments, or the dividing wall may comprise a curved wall and the transfer pipe may be substantially vertical, as discussed below with reference to FIGS. 9-12), and thus the intake and extract chambers 106 and 108 and screen 130 may have different shapes in different embodiments.

Figure 3:
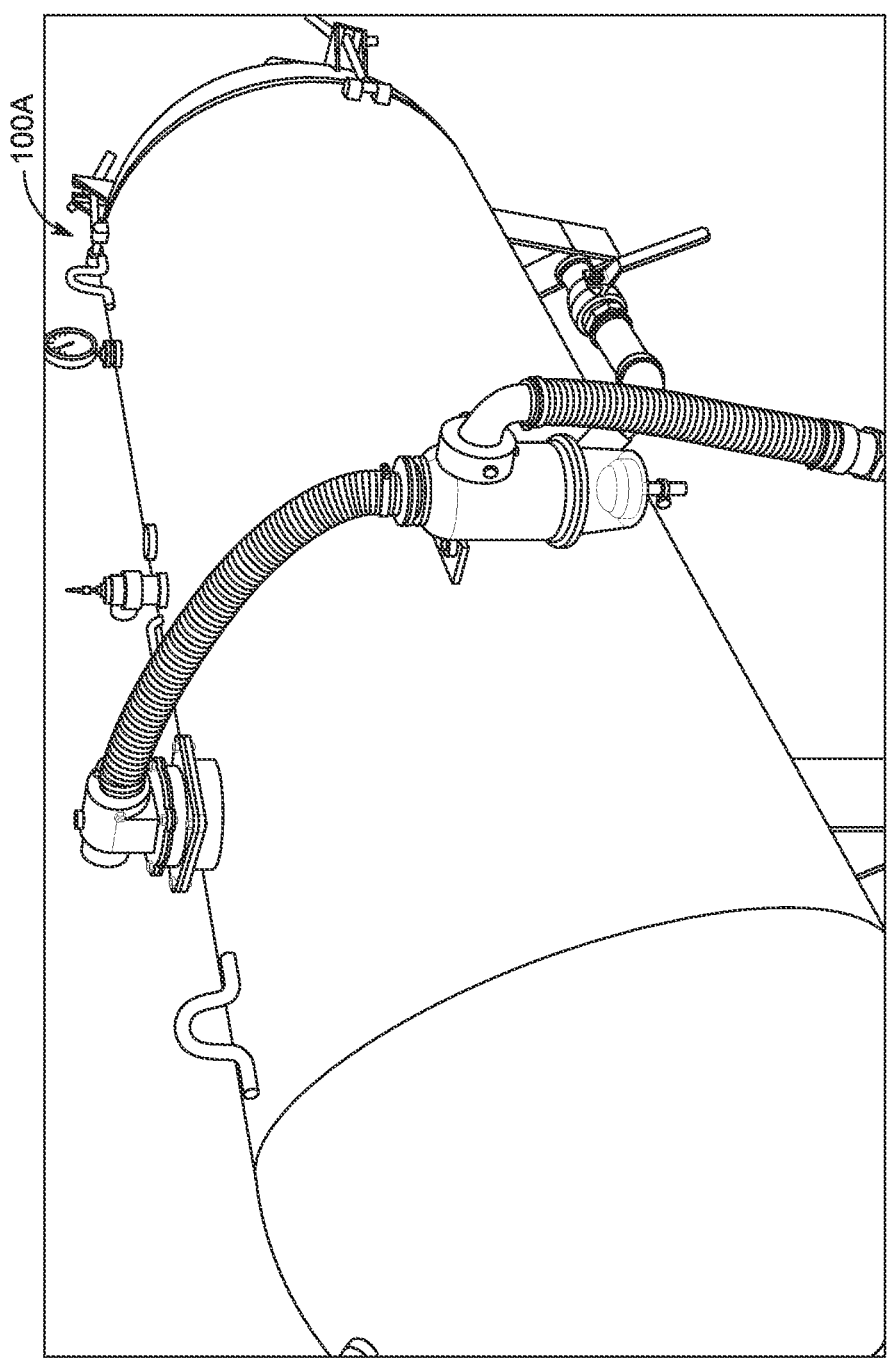
FIG. 3 shows an exterior view of a prototype dewatering apparatus according to one embodiment.
Figure 4:
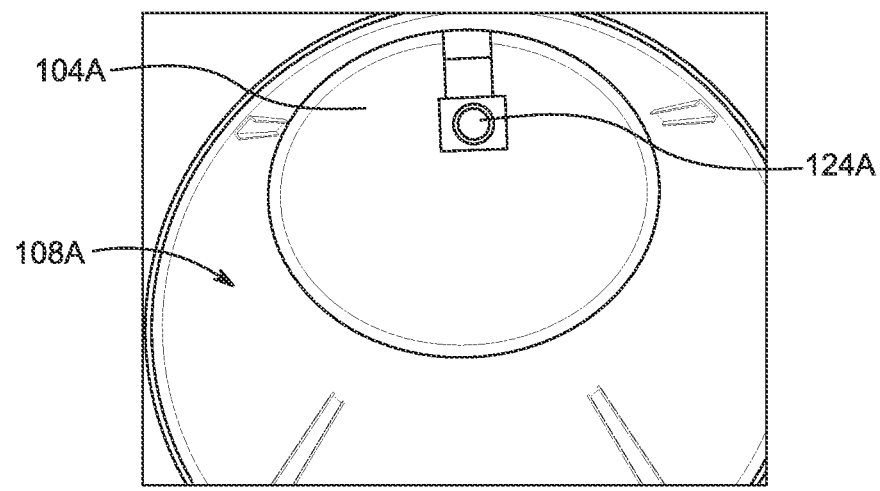
FIG. 4 shows a view of the interior of the extract chamber of the apparatus of FIG. 3.
Figure 5:
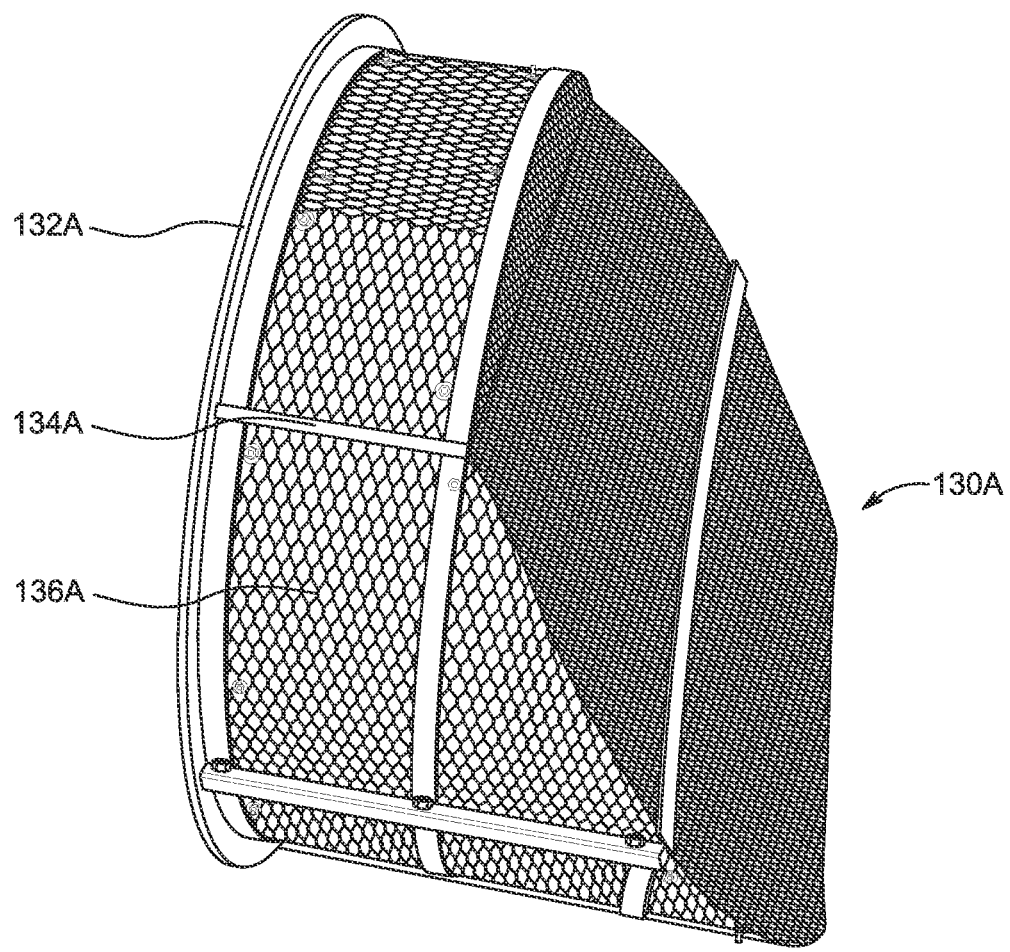
FIG. 5 shows the screen of the apparatus of FIG. 3.
Figure 6:
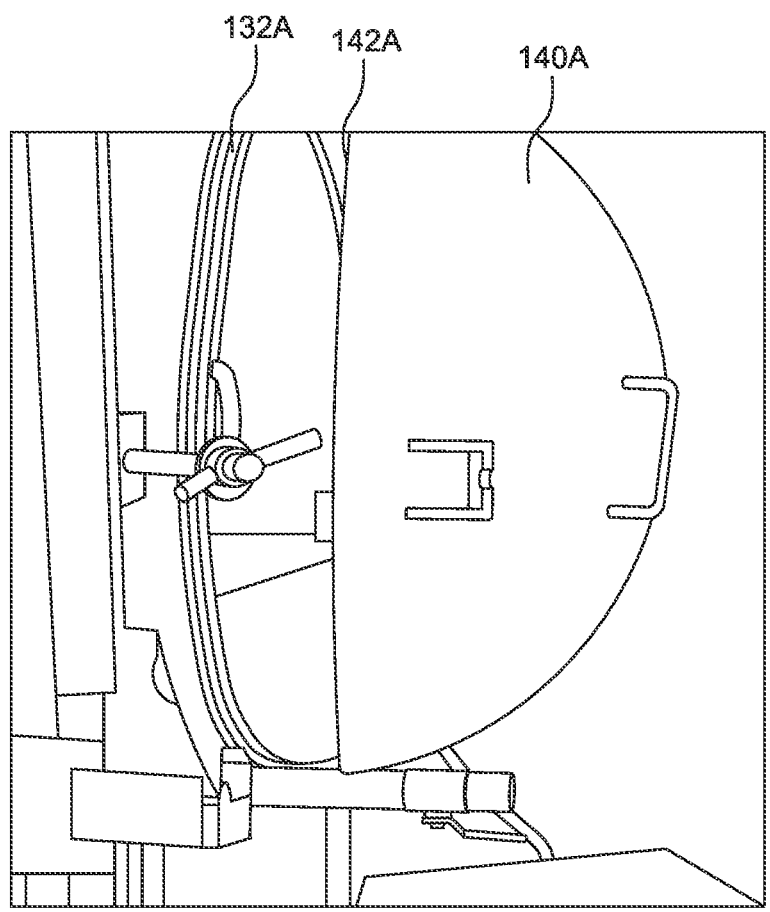
FIG. 6 shows the apparatus of FIG. 3 with the door open for removing solids from the extract chamber.

FIGS. 3, 4 and 5 show features of a prototype dewatering apparatus 100A according to one embodiment. Elements of the prototype apparatus 100A of FIGS. 3-5 are correspondingly numbered with corresponding elements of apparatus 100 of FIG. 1. FIG. 4 shows a view of the interior of the extract chamber 108A of the tank 102A of apparatus 100A of FIG. 3, wherein the second opening 124A of the transfer pipe 120A is shown protruding through the dividing wall 104A. FIG. 5 shows the screen 130A of the apparatus 100A of FIG. 3. The screen 130A comprises a rim 132A with a structural support frame 134A extending therefrom. A web 136A of wire mesh and fine screen material is supported by the rim 132A and frame 134A. FIG. 6 shows the apparatus 100A of FIG. 3 with the door 140A open for removing solids from the extract chamber.

Figure 7:
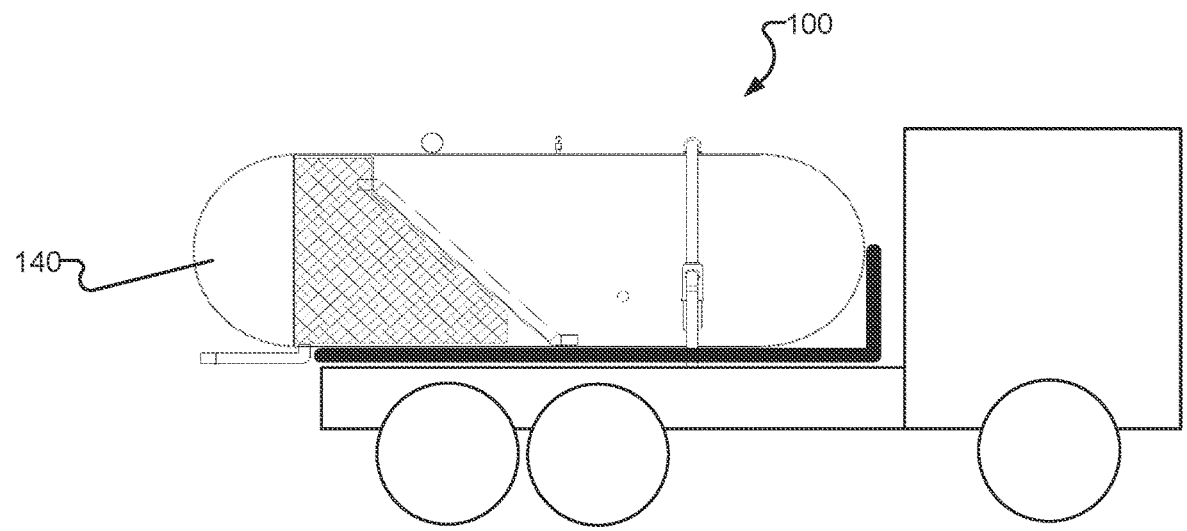
FIG. 7 shows an example dewatering apparatus installed on a truck bed according to one embodiment.
Figure 8:
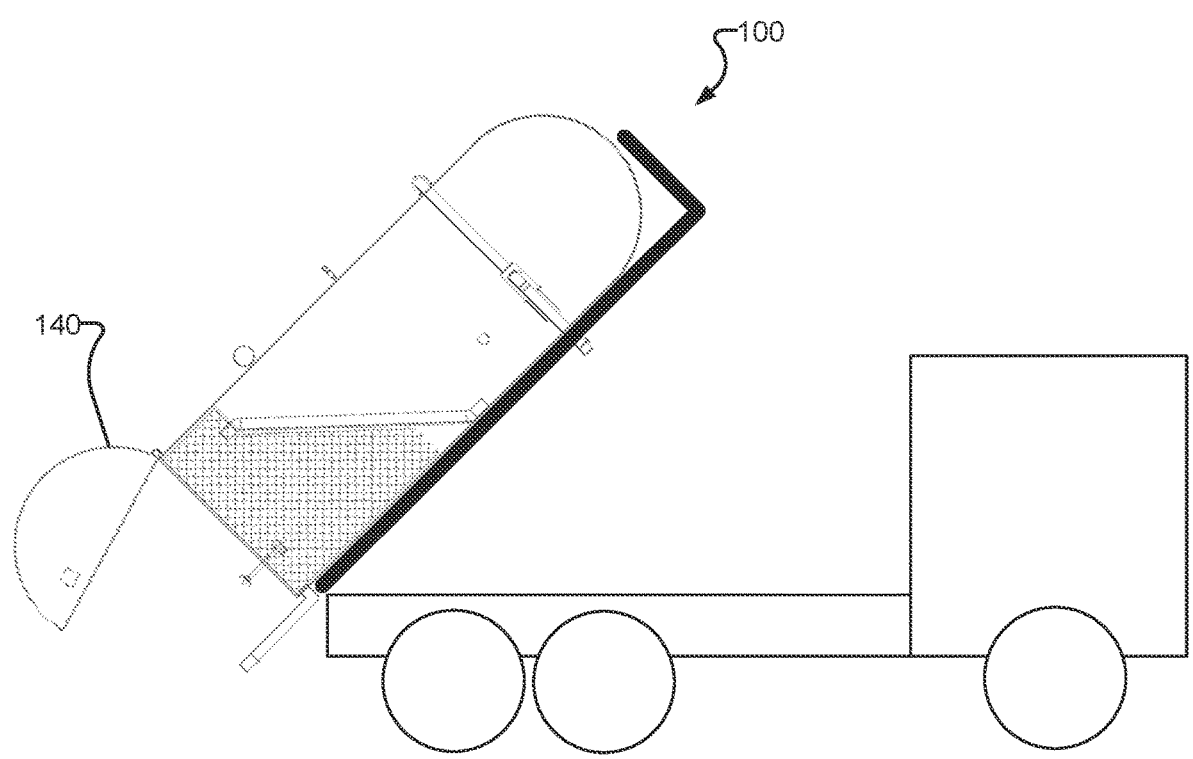
FIG. 8 shows the apparatus of FIG. 7 with the door open and the truck bed raised on an incline.
Figure 9:
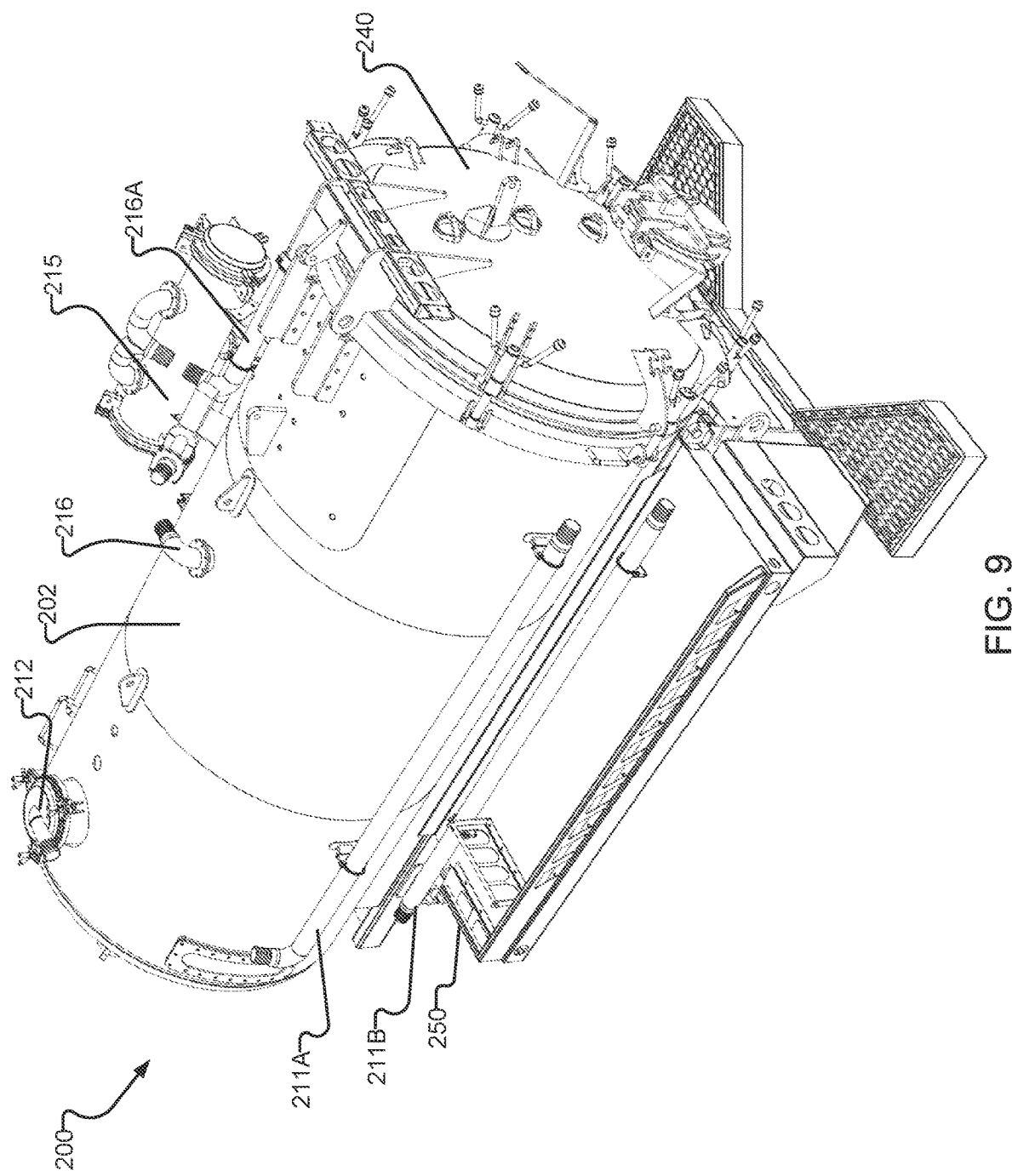
FIG. 9 shows an example dewatering apparatus according to one embodiment.
Figure 10:
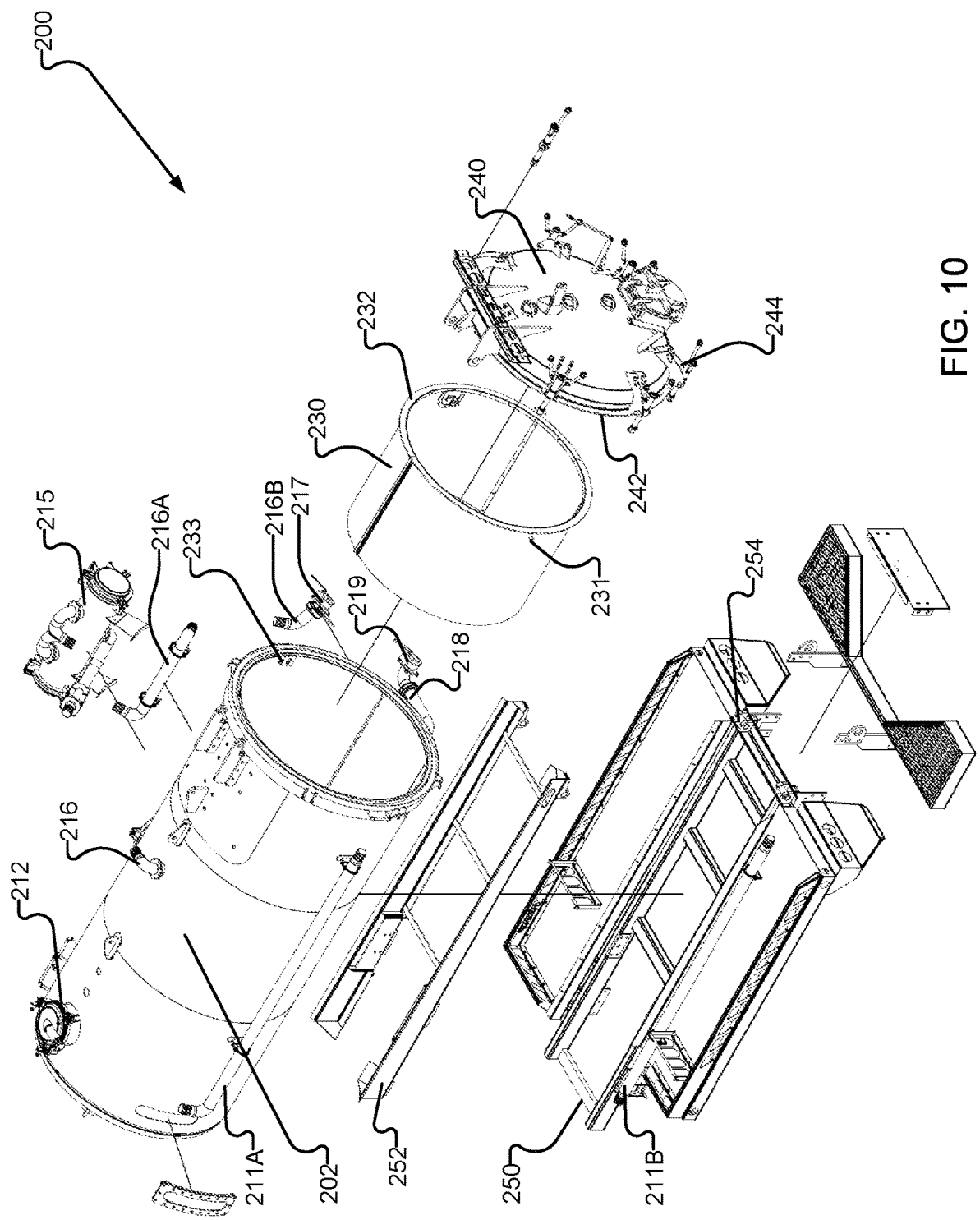
FIG. 10 is an exploded view of the apparatus of FIG. 9.

In some embodiments, dewatering apparatus 100/100A may be installed on a truck bed (as shown in FIGS. 7 and 8), on a trailer or any other transport platform to move the apparatus to and from worksites. The operation of the example apparatus 100 of FIGS. 1 and 2 is shown in FIG. 7 and FIG. 8 with the apparatus 100 in different orientations and the door 140 in a closed position and open position. In some embodiments, the apparatus 100 may move to a different orientation, for example by raising a truck bed on an incline, as shown in FIG. 8 with the door in an open position.

To commence sludge intake, the intake pipe 116 is connected to a hose or the like (not shown) that is placed into a source of sludge. Negative pressure is applied to the intake chamber 106 by the pump 110, with the intake valve 117 open, causing the sludge to be drawn into the intake chamber 106 through the intake pipe 116. A polymer is injected into the intake chamber 106, for example through a separate polymer injection valve (not shown). Injecting a suitable polymer into the intake chamber 106 causes solids in the sludge to coagulate into clumps as known in the art.

Once the sludge is in the intake chamber 106, the intake valve 117 is closed and positive pressure is applied to the intake chamber 106 by the pump 110, with the discharge valve 119 open. This positive pressure causes the sludge to be forced into the first opening 122, up the transfer pipe 120, and through the second opening 124 into the extract chamber 108. After the sludge passes through the second opening 124 into the extract chamber 108 the screen 130 separates the solid and liquid by blocking the solid and permitting the liquid to pass through the screen 130 and out through the discharge pipe 118.

In some embodiments, once liquid has been discharged, the door 140 is opened and the solids caught by the screen 130 within the extract chamber 108 are manually removed by shoveling or other means. In some embodiments, the tank 102 may be tipped for dumping, for example by raising a truck bed on an incline as shown in FIG. 8.

FIGS. 9-11D show another example apparatus 200. Elements of the apparatus 200 of FIG. 9-11D are correspondingly numbered with corresponding element of apparatus 100 of FIG. 1, in the form of 2xx instead of 1xx. The apparatus 200 operates substantially similarly to the apparatus 100 of FIG. 1 but differs from apparatus 100 in a number of details, including the shape of the intake chamber 206, extract chamber 208, dividing wall 204, transfer pipe 220 and screen 230, as discussed below. In the example of FIGS. 9-11D, elements of the apparatus 200 constructed from steel or other rigid materials are shown, but various flexible hoses connecting pipes of the apparatus 200 to each other are not shown, as described below.

The apparatus 200 comprises a tank 202 having an internal space divided by a dividing wall 204 into an intake chamber 206 and an extract chamber 208. In this embodiment the dividing wall 204 does not have an angled section, but is instead curved in a manner similar to the opposite side of the intake chamber 206 such that the intake chamber 206 itself is in the form of a pressure tank. In the illustrated example, the intake chamber 206 has a baffle assembly 207 (see FIG. 11A) therein for reducing sloshing of material within the tank 202 when a truck is driving with the apparatus 200 mounted thereon.

Figure 11:
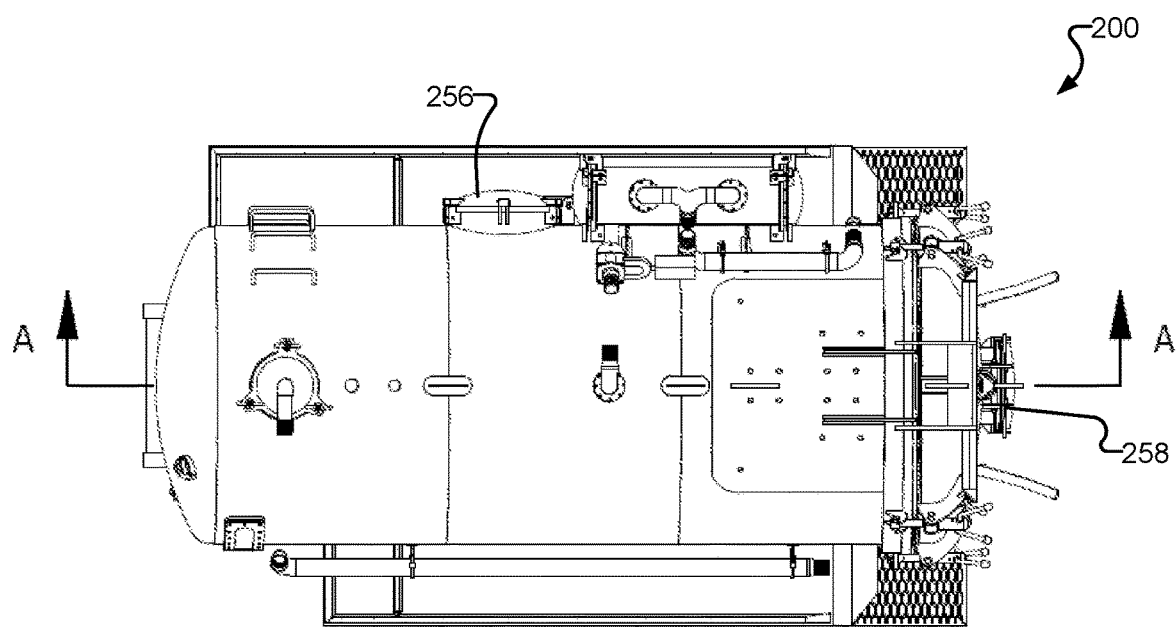
FIG. 11 is a top view of the apparatus of FIG. 9.
Figure 11A:
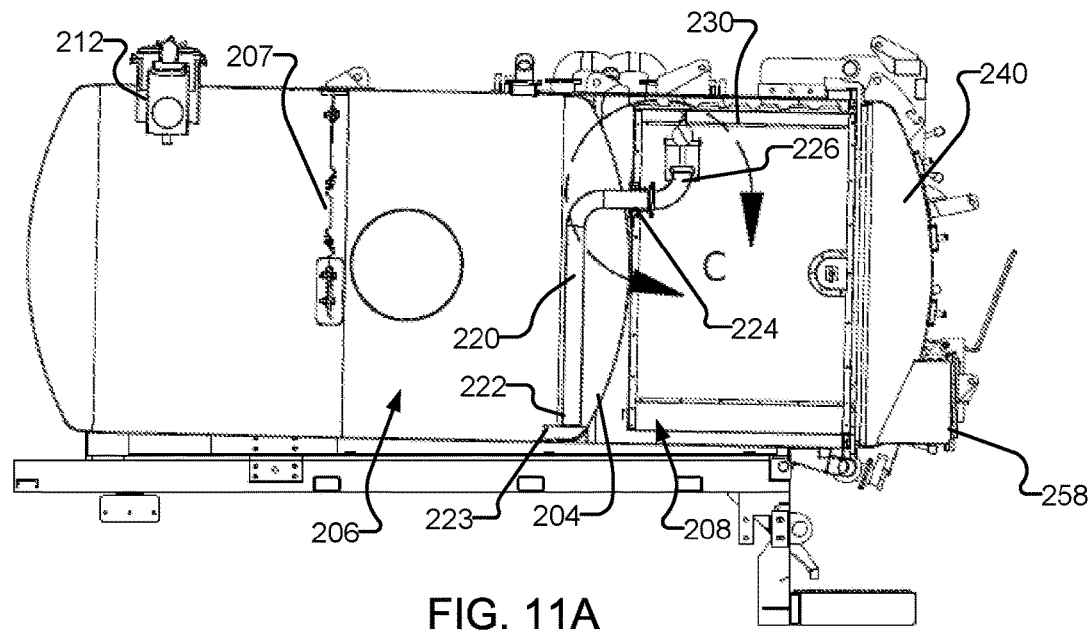
FIG. 11A is a sectional view taken along line A-A in FIG. 11.
Figure 11B:
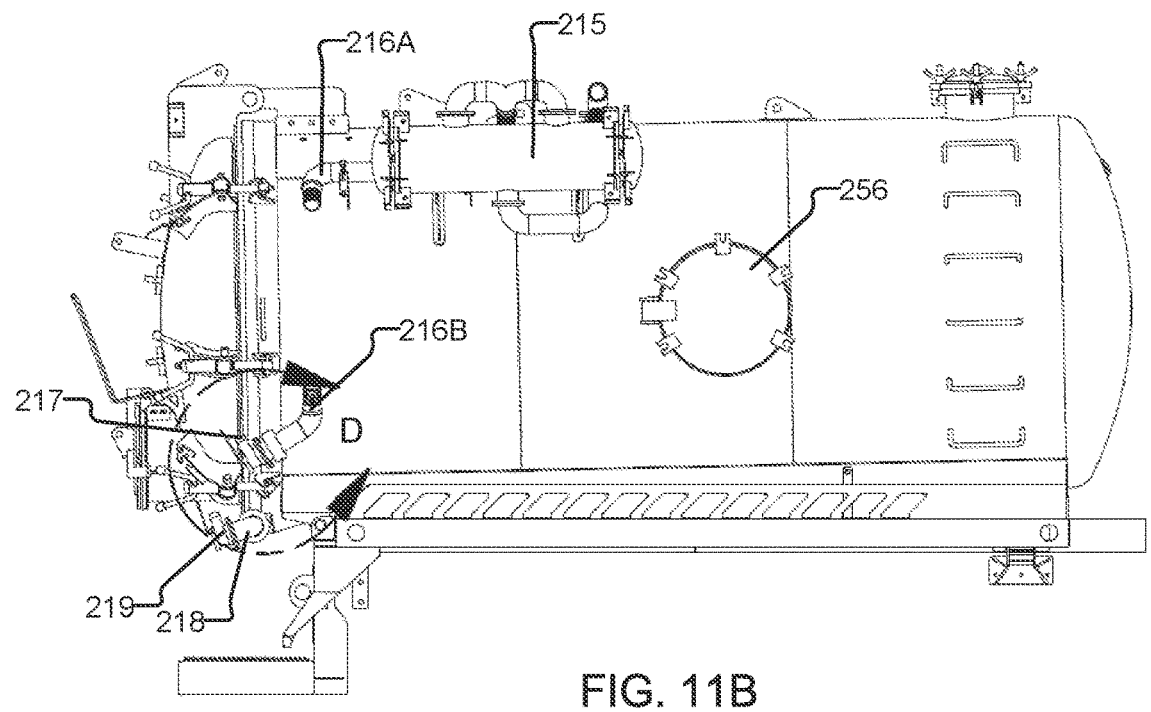
FIG. 11B is a side view of the apparatus of FIG. 9.
Figure 11C:
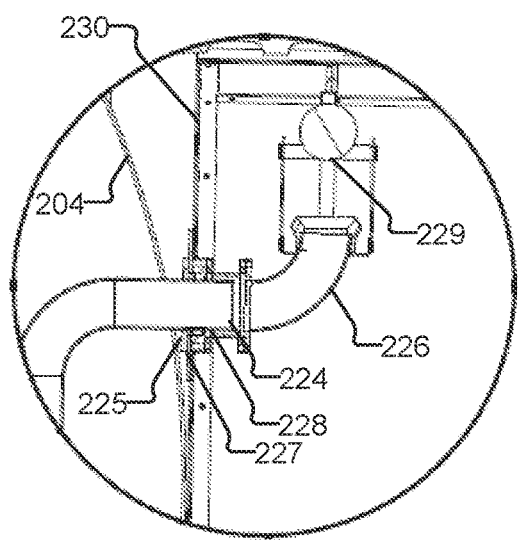
FIG. 11C shows a detailed view of the area in circle C of FIG. 11A.
Figure 11D:
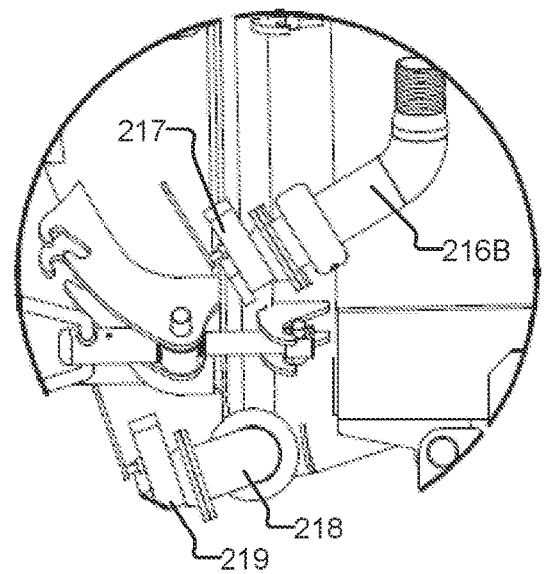
FIG. 11D shows a detailed view of the area in circle D of FIG. 11B.

The tank 202 is mounted on a deck assembly 250 configured to be mounted on a truck. A sill assembly 252 is attached to the bottom of the tank 202, and the sill assembly 252 is pivotally coupled to hinge pins 254 at the rear of the deck assembly 250 such that the tank 202 may be tilted up at the front for dumping. The sill assembly 252 may be higher at the front that the back such that the tank 202 is at a slight incline, as best seen in FIGS. 11A and 11B.

A pump (not shown) is connected to the intake chamber 206 to selectively create positive and negative pressure in the intake chamber 206. In the illustrated example the pump is configured to be coupled to a primary float trap 212 though a first connecting pipe 211A mounted on the side of the tank 202 and a second connecting pipe 211B mounted on the deck assembly 250. Flexible hoses (not shown) are connected between the primary float trap 212 and the first connecting pipe 211A, between the first connecting pipe 211A and the second connecting pipe 211B, and between the second connecting pipe 211B and the pump. The pump may also have one or more secondary filters (not shown) associated therewith. The pump, float trap 212 and filters may be substantially the same as those in standard vacuum trucks.

An intake pipe 216/216A/216B having an intake valve 217 is connected to the intake chamber 206 for drawing sludge or other materials into the tank as discussed below. In the illustrated example, a coarse intake filter 215, such as for example a canister filter, is connected by flexible hoses (not show) between a first portion 216 of the intake pipe and a second portion 216A of the intake pipe to prevent large (e.g. greater than about ½ inch diameter) solids from entering the intake chamber. The second portion 216A of the intake pipe is connected by another flexible hose (not shown) to a third portion 216B of the intake pipe that has the intake valve 217. A discharge pipe 218 having a discharge valve 219 is connected to the extract chamber 208 for discharge of liquids from the tank as discussed below.

With reference to FIGS. 10, 11A, 11C, 12, 12A and 12B, the apparatus 200 comprises a transfer pipe 220 which is generally vertically oriented (with a bend near the top thereof such that the top is generally horizontal) when the tank 202 is horizontal. The transfer pipe 220 provides fluid communication between the intake chamber 206 and the extract chamber 208. The transfer pipe 220 has a first opening 222 near the bottom of the intake chamber 206 and a second opening 224 near the top of the extract chamber 208. The dividing wall 204 has an opening near the top thereof to permit the transfer pipe 220 to pass through, but otherwise seals off the extract chamber 208 from the intake chamber 206. A screen 230 is positioned within the extract chamber 208 between the second opening 224 of the transfer pipe 220 and the opening of the discharge pipe 218. In some embodiments, the screen 230 may substantially conform to the shape of the extract chamber 208. The screen 230 has a hole for receiving the upper end of the transfer pipe 220 such that the second opening 224 is inside of the screen 230. In the illustrated example, a snorkel assembly 226 is attached to the second opening 224 of the transfer pipe 220, as described below.

Figure 12B:
FIG. 12B is a front view of the transfer pipe of FIG. 12.
Figure 12A:
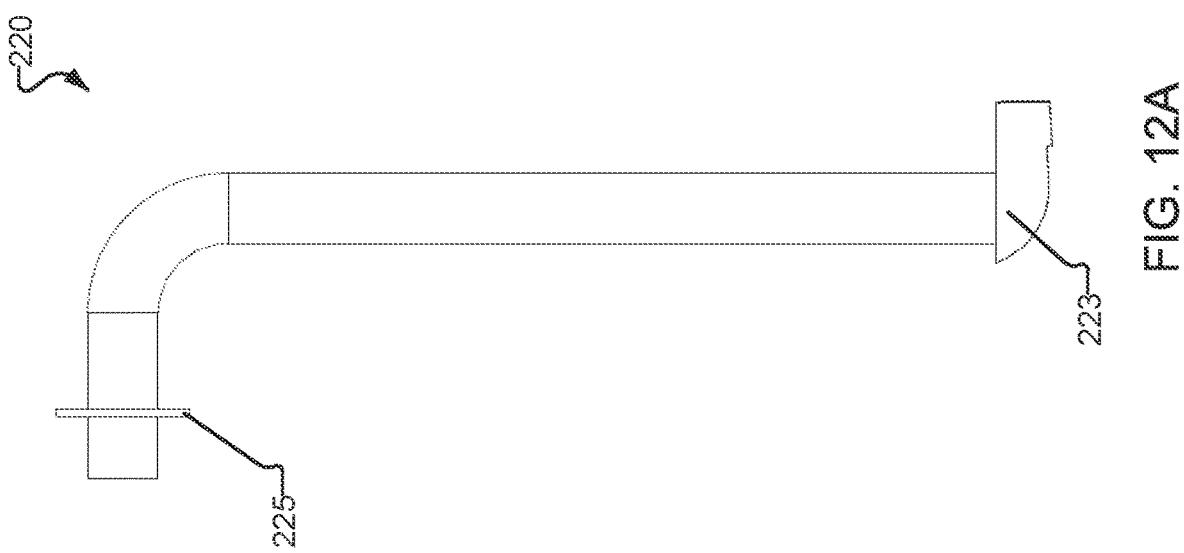
FIG. 12A is a side view of the transfer pipe of FIG. 12.
Figure 12:
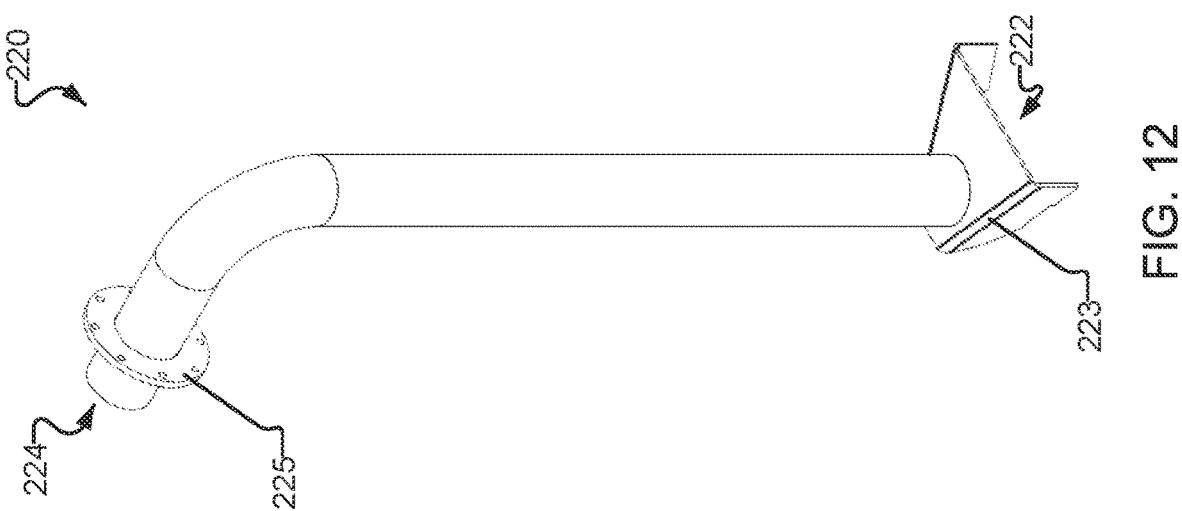
FIG. 12 shows the transfer pipe of the apparatus of FIG. 9.

The first opening 222 at the bottom of the transfer pipe 220 has a funnel-type structure 223 for guiding fluid into the transfer pipe 220. As best seen in FIG. 12A, the bottom of the funnel-type structure 223 is shaped to conform to the bottom of the tank 202 and bottom portion of the dividing wall 204 where it meets the tank 202. A flange 225 is provided near the second opening 224 of the transfer pipe 220. The flange 225 is configured to be bolted to a corresponding flange 227 of the snorkel assembly 226, which is attached to the screen by a sealing gasket 228. The snorkel assembly 226 also comprises a floating ball valve 229 which allows material to enter the extract chamber 208 from the transfer pipe 220 when positive pressure is applied to the intake chamber 206, and prevents material from leaving the extract chamber 208 through the transfer pipe 220 when negative pressure is applied to the intake chamber 206.

In the illustrated example, the end portion of the extract chamber 208 of the tank 202 comprises a door 240 which may be opened to permit access to the extract chamber 208 for removal of solids. The screen 230 comprises an open end with a generally circular rim 232 which presses up against a rim 242 of the door 240 when the screen 230 is in place and the door 240 is closed. The screen 230 may have pins 231 on opposed sides thereof configured to be received in pin receivers 233 (see FIG. 10) on the inside of the extract chamber 208. One or more sealing rings (not shown) may be provided at the interface between the rim 242 of the door 240 and the rim 232 of the screen. The door 240 may be held closed by a plurality of latches 244 or any other suitable mechanism.

The tank 202 may also be provided with a relief valve (not shown) and a pressure gauge (not shown). In the illustrated example, the tank 202 has an access hatch 256 (see FIGS. 11 and 11B) at one of the sides of the intake chamber 206 for providing access thereto, and the door 240 has a dump port 258 in a lower portion thereof. The hatch 256 and/or dump port 258 may be at different locations in other embodiments. The dump out 258 may be referred to as an access hatch, a mud gate, cleanout, and so on.

In operation, to commence sludge intake, the intake pipe 216B is connected to a hose or the like (not shown) that is placed into a source of sludge. Negative pressure is applied to the intake chamber 206 by the pump, with the intake valve 217 open, causing the sludge to be drawn into the intake chamber 206 through the intake pipe 216. A polymer is injected into the intake chamber 206, for example through a separate polymer injection valve (not shown). Injecting a suitable polymer into the intake chamber 206 causes solids in the sludge to coagulate into clumps as known in the art. Once the sludge is in the intake chamber 206, the intake valve 217 is closed and positive pressure is applied to the intake chamber 206 by the pump, with the discharge valve 219 open. This positive pressure causes the sludge to be forced into the first opening 222, up the transfer pipe 220, and through the second opening 224 into the extract chamber 208. After the sludge passes through the second opening 224 into the extract chamber 208 the screen 230 separates the solid and liquid by blocking the solid and permitting the liquid to pass through the screen 230 and out through the discharge pipe 218.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Although the embodiments have been described in detail, it should be understood that various changes, substitutions and alterations can be made herein. Moreover, the scope of the present application is not intended to be limited to the particular embodiments of the process, machine, manufacture, composition of matter, means, methods and steps described in the specification. As can be understood, the examples described above and illustrated are intended to be exemplary only.

As will be apparent to those skilled in the art in light of the foregoing disclosure, many alterations and modifications are possible to the methods and systems described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The present disclosure may be embodied in other specific forms without departing from its spirit or essential characteristics. The described embodiments are to be considered in all respects only as illustrative and not restrictive.

The invention claimed is:

1. A method for dewatering sludge comprising:
providing an apparatus comprising a tank having an internal space divided by a dividing wall into an intake chamber and an extract chamber; an intake pipe connected to the intake chamber by an intake valve; a discharge pipe connected to the extract chamber by a discharge valve; a transfer pipe providing fluid communication between the intake chamber and the extract chamber, with a first opening near the bottom of the intake chamber and a second opening near the top of the extract chamber; a pump for selectively creating positive and negative pressure within the intake chamber; and, a screen within the extract chamber positioned between the second opening of the transfer pipe and the discharge pipe,
applying negative pressure to the intake chamber by the pump with the intake valve open to suck a mixture of solid and liquid into the intake chamber, through the intake pipe;
injecting a polymer into the intake tank to coagulate the solids; and
applying positive pressure to the intake chamber by the pump with the intake valve closed and the discharge valve open to force the mixture of coagulated solid and liquid through the transfer pipe into the extract chamber, whereby the screen traps the coagulated solids allowing liquid to pass through the discharge pipe,
wherein an end of the tank adjacent to the extract chamber comprises a door having a rim, and wherein the screen conforms to the shape of the extract chamber and comprises an open end with a circular rim which presses against the rim of the door when the door is closed, the method comprising opening the door to remove solids from the extract chamber without removing the screen.

* * * * *